United States Patent [19]
Bichot et al.

[11] 4,160,398
[45] Jul. 10, 1979

[54] METHOD AND APPARATUS FOR MANUFACTURE OF INSULATING SLEEVES

[75] Inventors: Bernard H. Bichot, Clermont; René Gest, Rantigny, both of France

[73] Assignee: Saint-Gobain Industries, Neuilly-sur-Seine, France

[21] Appl. No.: 882,441

[22] Filed: Mar. 1, 1978

Related U.S. Application Data

[63] Continuation of Ser. No. 578,087, May 16, 1975, abandoned.

[51] Int. Cl.² ............................................. B26D 3/08
[52] U.S. Cl. .......................................... 83/865; 83/54; 83/191
[58] Field of Search ................. 83/407, 425, 330, 440, 83/862, 865, 191, 54; 156/191, 426

[56] References Cited

U.S. PATENT DOCUMENTS

| | | | |
|---|---|---|---|
| 1,220,288 | 3/1917 | Subers | 156/426 |
| 3,265,552 | 8/1966 | Berggren et al. | 264/146 X |
| 3,715,941 | 2/1973 | Andrews et al. | 83/54 X |
| 3,755,039 | 8/1973 | Terry | 156/187 |
| 3,839,122 | 10/1974 | Current et al. | 83/54 X |
| 3,855,886 | 12/1974 | Andrews | 83/54 X |

*Primary Examiner*—David A. Simmons
*Attorney, Agent, or Firm*—John T. Synnestvedt; Kenneth P. Synnestvedt

[57] ABSTRACT

Making insulation sleeves from binder containing fibrous material, including integrated method and apparatus features for dividing a continuous blanket or web of fibrous material into individual lengths, winding individual lengths of fibrous blanket upon a multi-part separable mandrel, heating the mandrel to cure the binder in the inside surface layer of the sleeve, separating the sleeve from the mandrel, bringing the outside surface of the sleeve into contact with a heated surface to cure the binder in the outside surface layer of the sleeve, delivering the sleeves to a curing oven in which the sleeves are advanced and rotated, trimming the ends of the sleeves, and axially slitting the sleeves.

4 Claims, 39 Drawing Figures

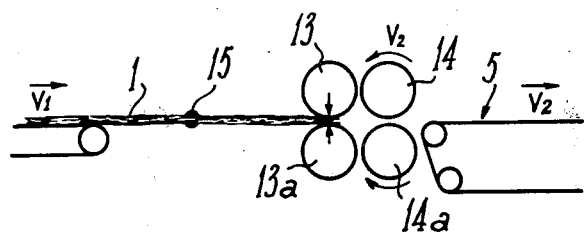
Fig. 2a
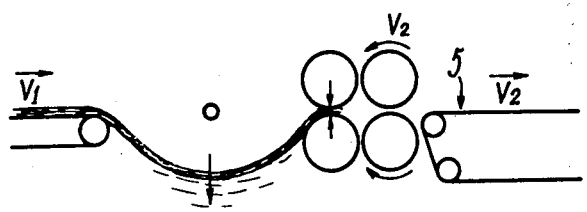
Fig. 2b
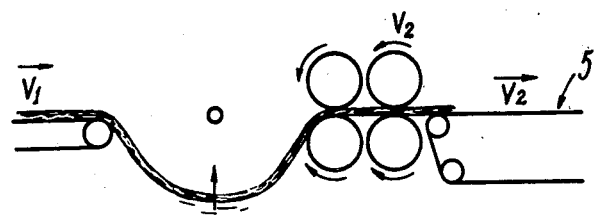
Fig. 2c
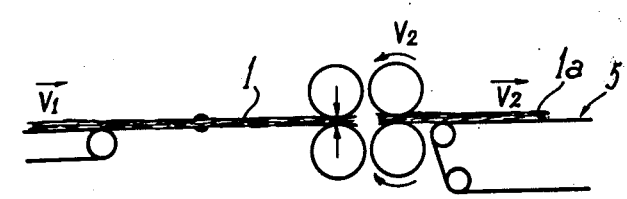
Fig. 2d
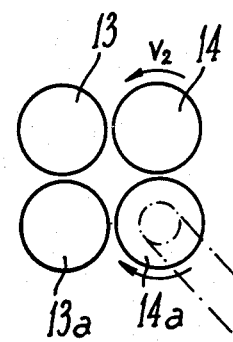
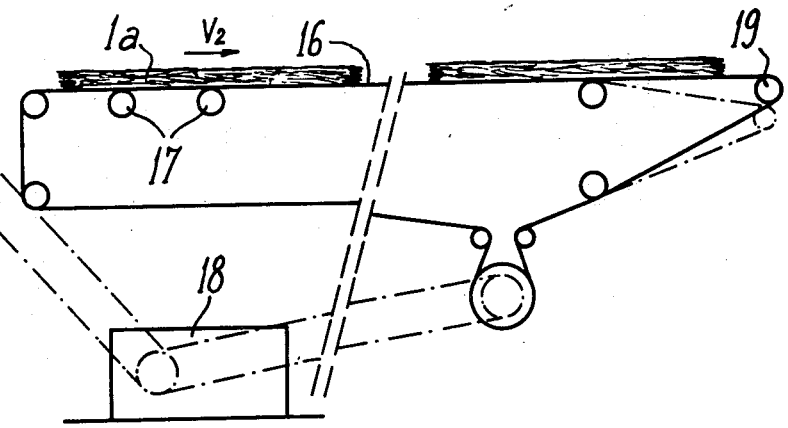
Fig. 3

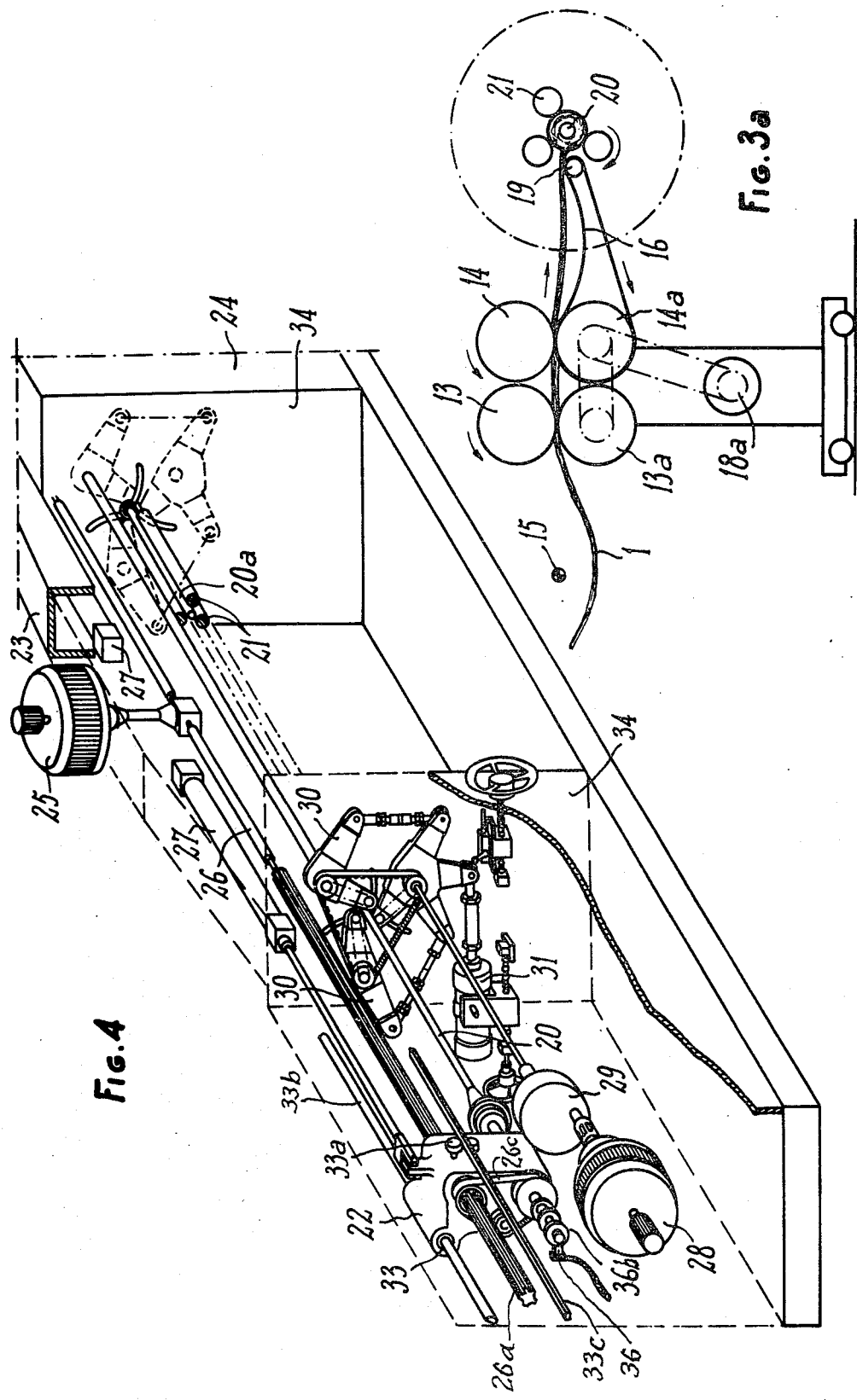

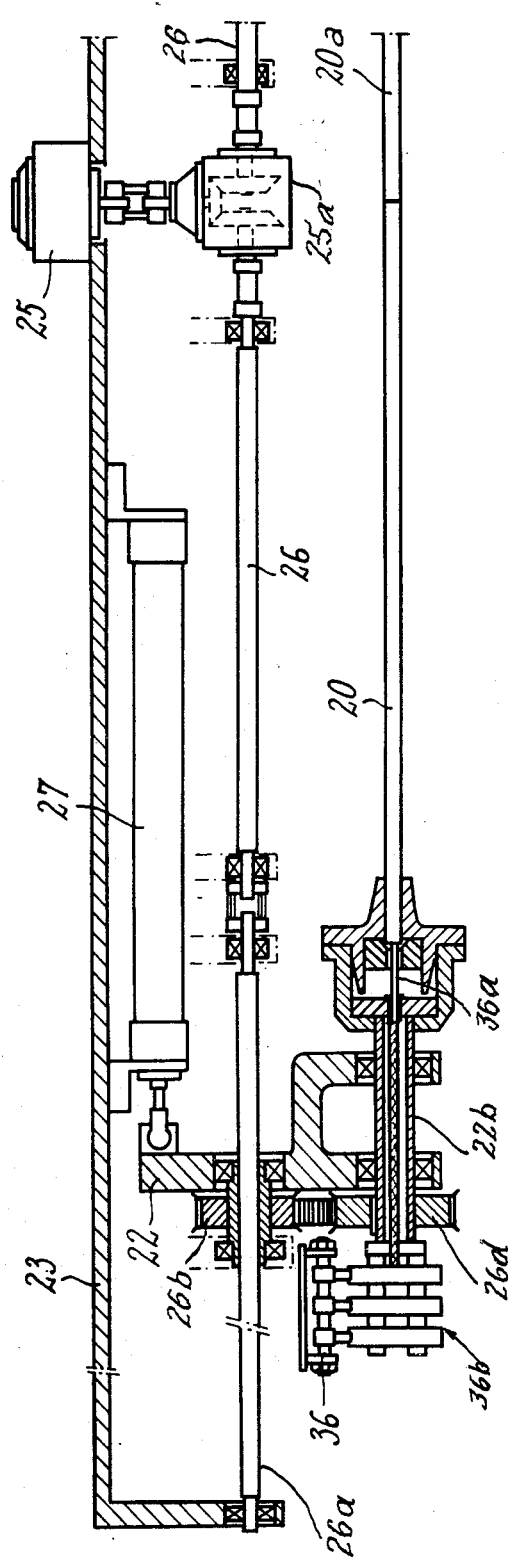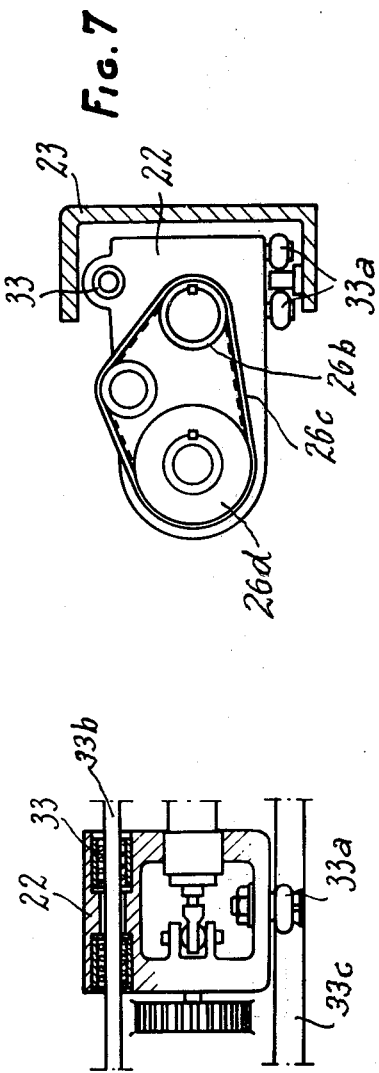

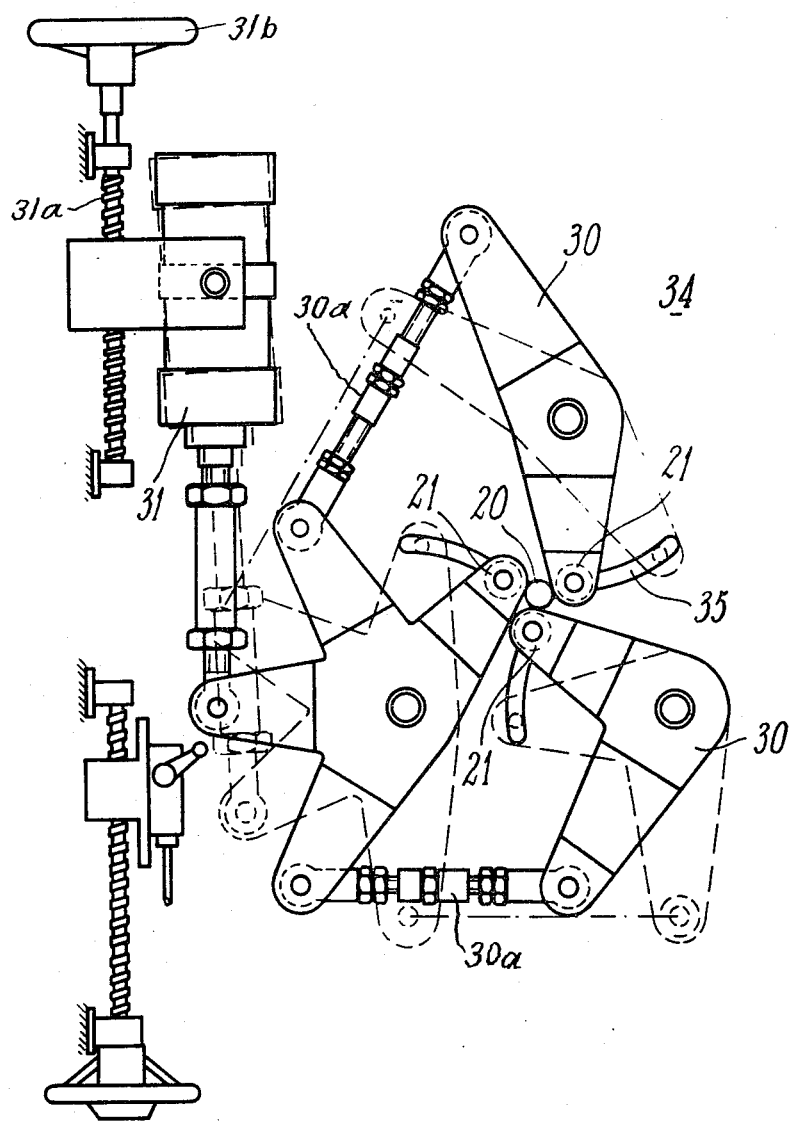

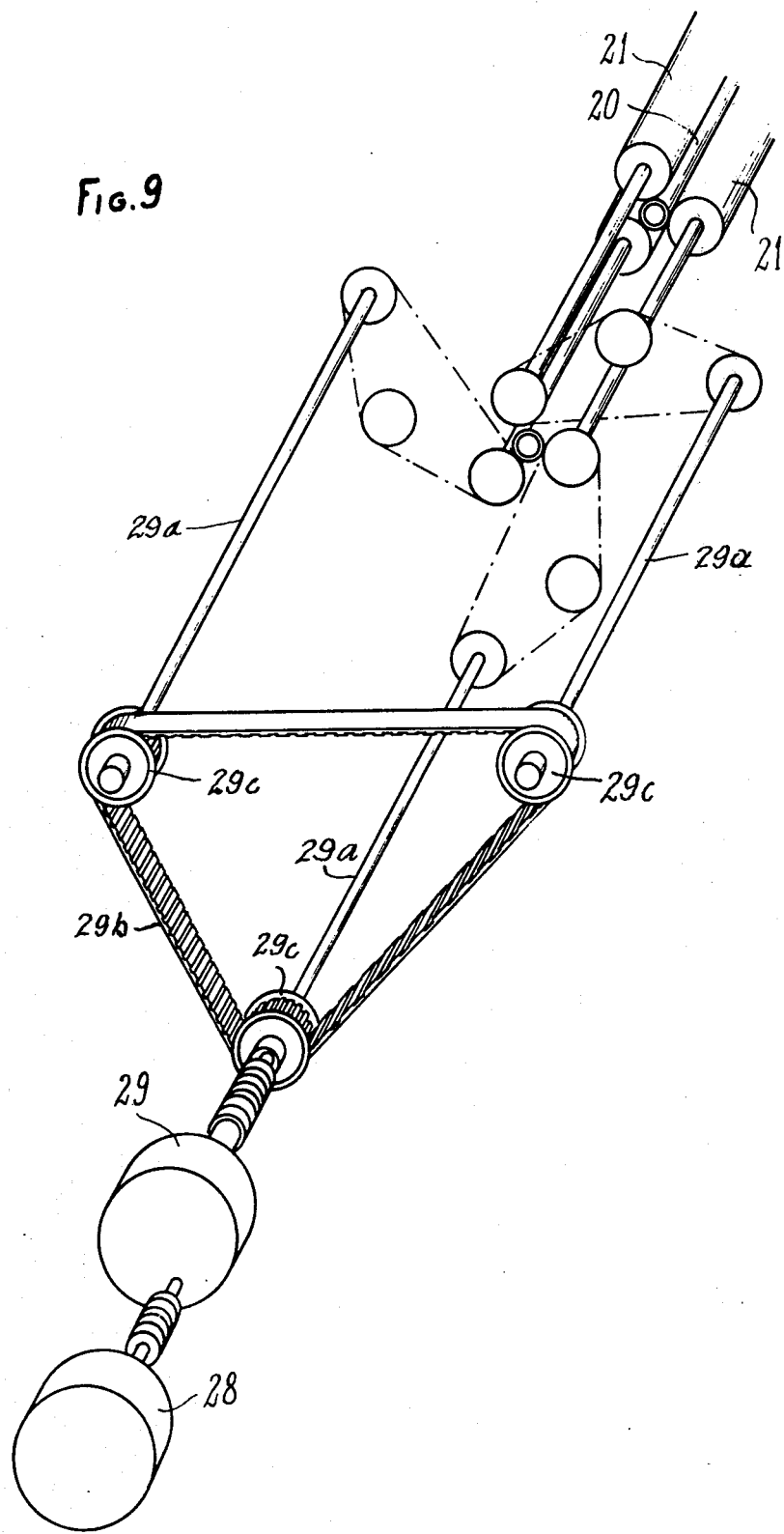

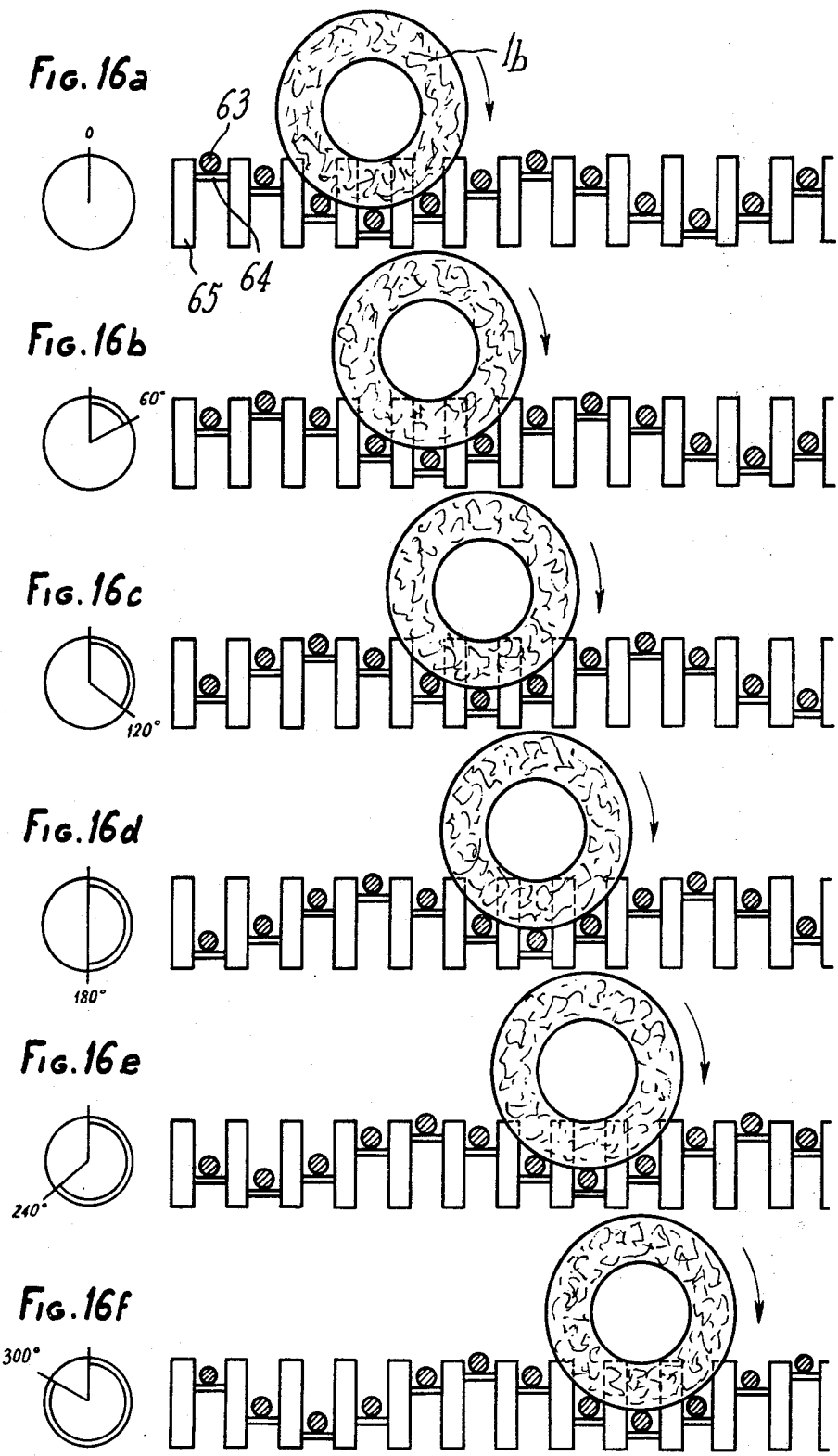

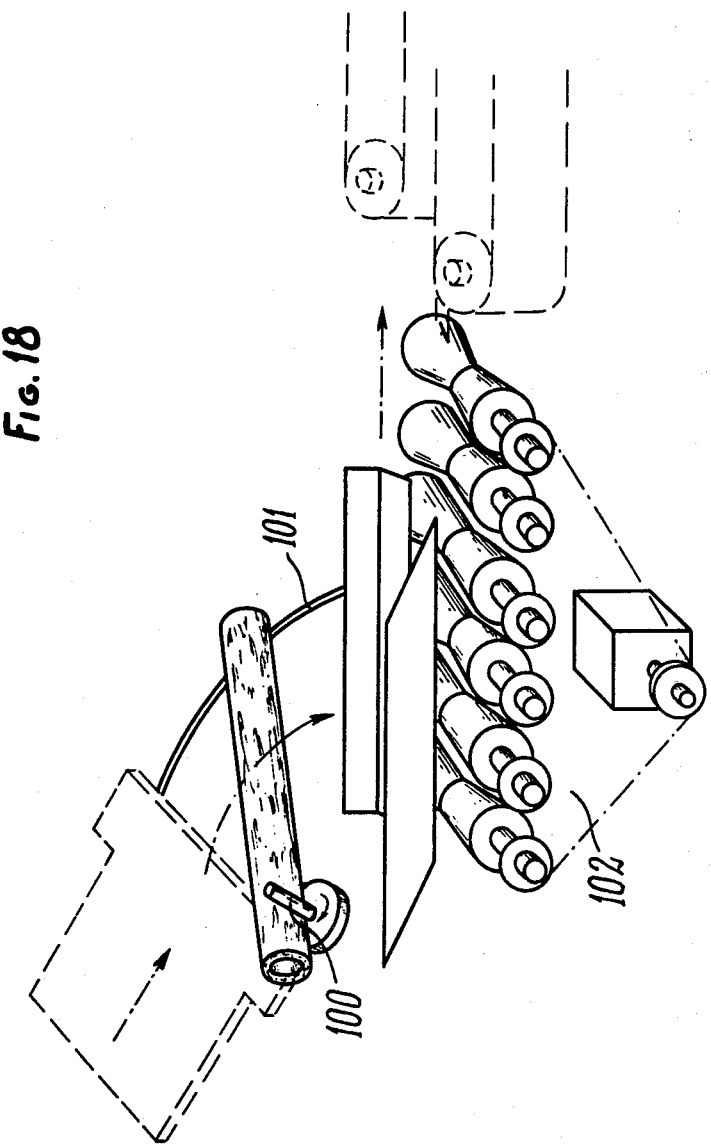

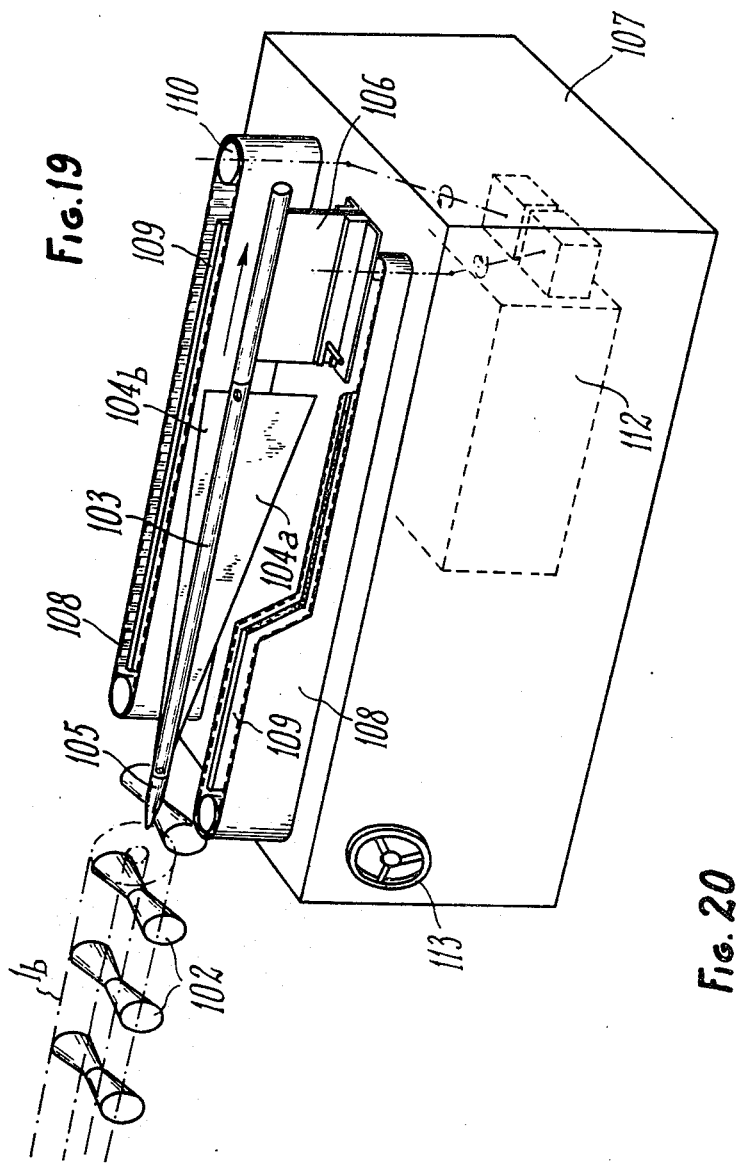
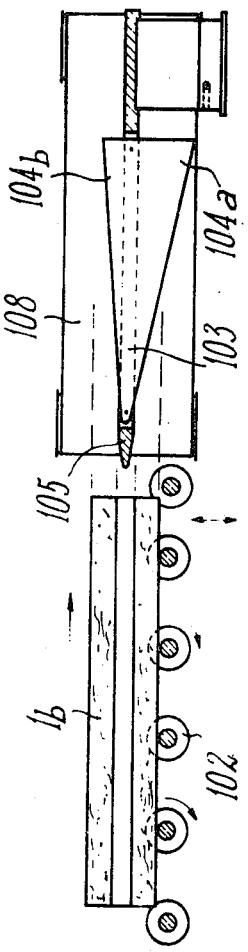
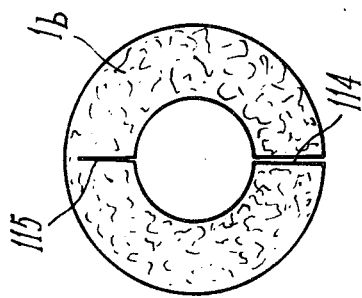

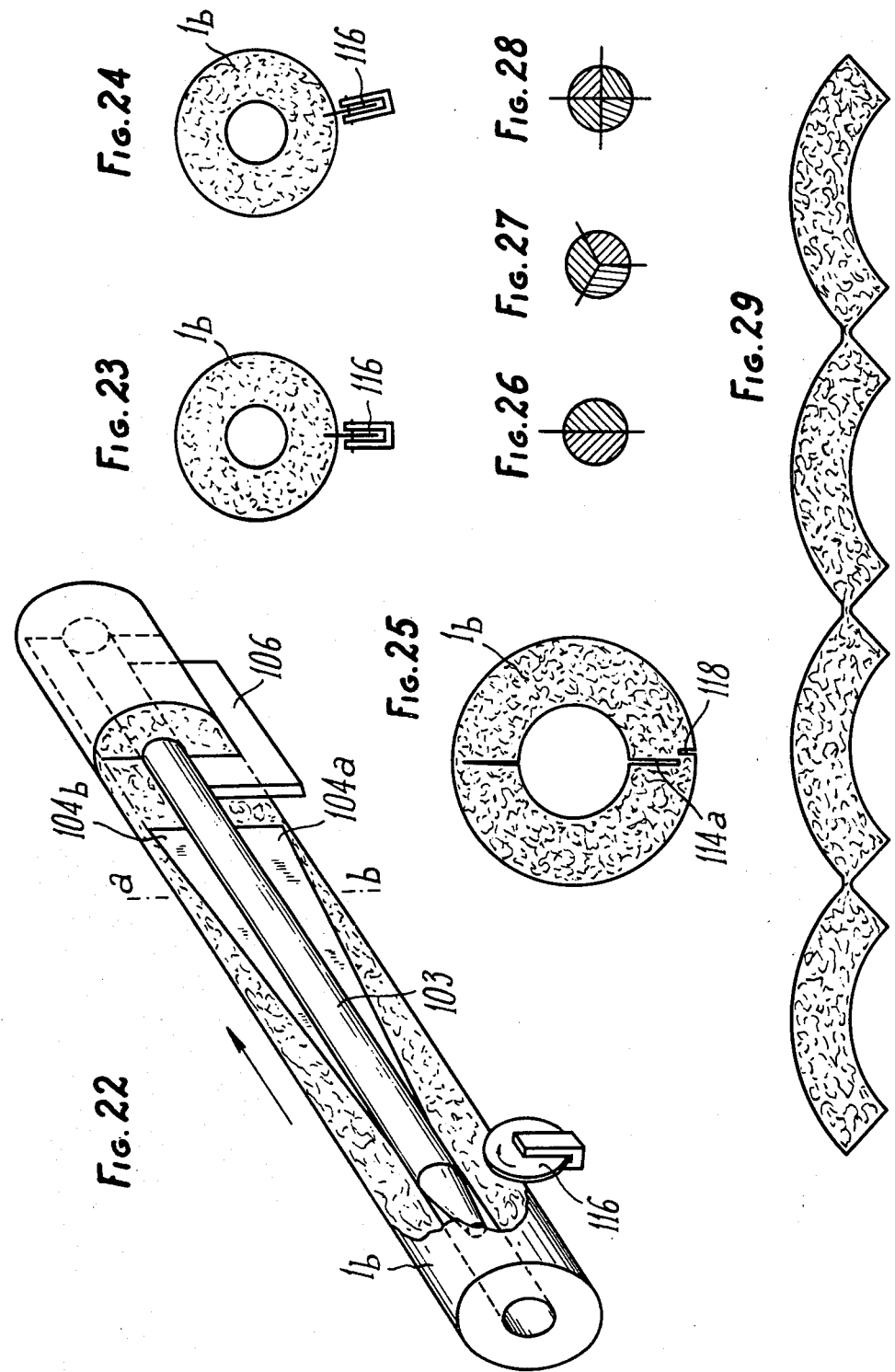

METHOD AND APPARATUS FOR MANUFACTURE OF INSULATING SLEEVES

This is a continuation of application Ser. No. 578,087, filed May 16, 1975, now abandoned.

This invention relates to the manufacture of tubular fibrous products in the form of sleeves, notably insulation for pipes, conduits or the like, these sleeves being formed of fibers, in particular glass fibers or other mineral fibers between which a polymerizable binder is distributed. This binder is commonly constituted of a phenol-formaldehyde resin, a phenol-urea resin or a phenol-melamine copolymer.

This invention refers more particularly to a method according to which the mat, in which the binder is distributed and which preferably passes first through a drying oven, is shaped on a rotating mandrel at which time polymerization of the binder begins, and is thereafter conveyed to an oven in order to complete the polymerization.

It has for a principal object a method that provides, in a continuous high output operation, production of fibrous sleeves of low specific density and of high thermal insulating character. Such sleeves may also have a small outside diameter.

According to prior or known methods, the sleeve, in which the resin is partially polymerized, is conveyed, while supported by a mandrel, to an oven where full polymerization is effected. Such known methods have the disadvantage that they necessitate the use of a large number of mandrels, and present serious difficulties in handling, and also the danger of producing, in contact with a heated mandrel, a deterioration of the sleeve in contact with the surface of the mandrel, the temperature of this surface being difficult to control. Further, the mandrels themselves, especially if they are of small diameter sustain detrimental deterioration in the course of treatments and handling.

According to other known methods, the sleeve, in which the resin is partially polymerized, is separated from the mandrel immediately after its winding, and is then directed to the polymerization oven, without any intermediate operation to increase its dimensional stability in the outer surface layer thereof. Even if the formed sleeves are subjected to a preliminary smoothing operation on the outer surface, methods of this kind still have the disadvantage of subjecting the sleeves while they are still in a deformable state, to handling or manipulation tending to disrupt the other surface of the sleeve, thereby obtaining products of poor quality. If the outer surface of the sleeve is stabilized while the sleeve is still on the mandrel, then the period of time during which the sleeve remains in the mandrel is prolonged to such an extent that the overall processing or manufacture time of each sleeve is greater than is necessary.

According to the invention, the time during which the mat remains on the forming mandrel is reduced to a minimum, and the outside surface is subject to a separate stabilizing operation, so that the sleeve reaches the oven after a minimum elapse for completion of polymerization.

The method according to the invention preferably includes the following combination of steps:
in a first stage, the fiber mat, in which a binder is distributed, is wound on a heated mandrel, the temperature of the mandrel and the winding time of the mat on the latter being such that a hard inner surface if formed in contact with the mandrel, the polymerization of the binder next to this inner surface, being initiated;
in a second stage, the product thus formed is separated from the mandrel and the entire outer surface is brought into contact under light compression with a smooth heated surface, the temperature of this surface and the length of contact being such that a hard outer surface is rapidly formed, the polymerization of the binder next to this outer surface being initiated, and all remaining binder remaining uncured:
in a third stage, the sleeve thus formed is conveyed to a heated zone arranged to permit the free passage of hot gas over the entire surface of the product, thus assuring a uniform polymerization to a definite degree throughout the thickness of said sleeve.

According to one embodiment, the method is characterized in that:
the mat, in which the binder is distributed, is cut into predetermined lengths, in order to convey it to the forming component;
several layers of the mat are wound on a mandrel heated to a temperature such that the mat adheres initially to the mandrel, and that sufficient polymerization occurs to form a hard inner surface, thereby facilitating separation of the mat from the mandrel, the polymerization of the binder next to this inner surface being initiated;
the sleeve is separated from the mandrel;
the sleeve is directed towards the means for effecting a polymerization of the resin throughout its thickness and in transit the sleeve is rolled along under light compression in contact with a surface heated to a temperature such as to effect a polymerization of the resin of the external surface sufficient to form a hard outer surface, assuring a definite smoothness of the outer surface and a dimensional stability of the sleeve, the polymerization remaining incomplete between the inner and outer surfaces;
the sleeve is conveyed into an oven permitting free passage of hot gas over its entire surface assuring a uniform polymerization of a definite degree throughout the thickness of said sleeve;
at the output of the oven, a cut is effected lengthwise along the sleeve;
and preferably passage of the cutting component is effected along the entire length of the sleeve to effect its splitting.

According to another feature of the invention, the cutting operation to a predetermined length, of the continuous web of uncured bonded mat, is obtained by tearing the mat and subjecting the mat at the end of tearing, to a sharp jerk, for instance by clamping the mat upstream, or by acceleration of the mat downstream, this operation being regularly repeated in order to obtain the necessary successive ruptures of the web.

Another feature of the invention consists of conveying the mat from the point of tearing to the mandrel, while maintaining the mat in contact with a smooth support permitting sliding without tearing at the moment of initiating the winding despite the increasing acceleration of movement of the mat in proportion to the increase in diameter of the sleeve in the course of the winding.

According to a particularly important feature, the mandrel is heated to a temperature providing for adherence of the first wind and the formation of a continuous hard inner surface which is dimensionally stable and thus preserves the corresponding shape of the mandrel after its disengagement from the sleeve, with the binder in an incomplete state of polymerization in the rest of the sleeve. After complete hardening of this inside surface, the disassembly of the sleeve from the mandrel is readily accomplished.

The invention permits attaining this hard inner surface in a length of time practically the same as the time of winding the mat on the mandrel.

The sleeve just formed, because of the existence of this hard inner surface, can be disengaged from the mandrel either at the moment the winding is completed or after a very short time if needed to assure mechanical smoothness of the sleeve.

It should be understood that the quantity of binder dispersed in the fibers of the sleeves is not so great as to completely infill the spaces between the fibers, in view of which the initial polymerization of the binder in the inner surface layer while the sleeve is on the mandrel does not produce a solid impervious layer, but produces a stabilized condition in the inner layer of the fibers, having a porous character through which some air may be circulated, as is desired in the subsequent treatment to complete the polymerization in the curing oven to be described hereinafter, and as is also desirable in the final product.

The invention provides also for the use of at least one pressing component with controlled movement that remains in contact with the sleeve during winding, exerting a constant pressure on the latter and maintaining it in rotation after disengagement from the surface of the mandrel.

It provides more particularly for, and this constitutes an important characteristic of the invention, the use of several rollers placed around the mandrel to assure uniformity of rolling and a good cohesion of the sleeve.

According to another characteristic of the invention, after its conformation and its separation from the mandrel, the sleeve is conveyed between two smooth surfaces having a relative movement in such a way as to effect the setting in rotation of the sleeve, at least one of these surfaces being heated in order to effect polymerization of the resin of the external surface and impart smoothness to this surface.

According to another advantageous feature of the invention, after formation of the external surface of each sleeve, the sleeve is conveyed to an oven in which provision is made for effecting rotation of and for advancing the sleeves. In rotating them, the movements of the sleeve in the oven provide for successive and repeated contacts with different portions of the exterior wall of the sleeve. This facilitates the passage of the hot curing gas over the entire surface of the sleeves, with some penetration of the gases into the interior of the sleeve wall, thereby effecting homogenous polymerization throughout the entire wall thickness of each sleeve.

According to another characteristic of the invention, the slitting of the sleeve is effected after angularly turning the sleeve to a new position in which the cutting is effected by a cutting element moving in a direction along the axis of the sleeve.

According to one embodiment, the cutting component is fixed and interconnected with a centering component penetrating the interior of the sleeve, the latter moving along its axis.

The invention also provides an apparatus in order to implement the method.

An embodiment of this apparatus, which is given for information but without limitation, is described hereafter in reference to the attached drawings, in which:

FIGS. 1a–1b together form a overall view in elevation of an installation according to the invention;

FIGS. 2a through 2d are fragmentary views in elevation of the apparatus for tearing the fibrous blanket or strip during the feed of the fibrous material;

FIG. 3 is a view in elevation of apparatus for transporting mat pieces from the tearing apparatus to the winding apparatus;

FIG. 3a is a view in elevation of an alternative form of mat transport apparatus;

FIG. 4 is an isometric view of the winding apparatus;

FIG. 5 is a cross-sectional view of a portion of the winding apparatus;

FIGS. 6 and 7 are detailed cross-sectional views of the winding apparatus.

FIG. 8 is an end view of portions of the winding apparatus showing the disposition of the rollers and of the mechanism for effecting a synchronized separation of them;

FIG. 9 is an isometric view of the means for controlling the rotation of the winding rollers;

FIGS. 16a to 16f are schematic views illustrating the movements of the sleeves in the oven;

FIG. 18 is an isometric view of the apparatus providing for pivoting of the sleeves;

FIG. 19 is an isometric view of the apparatus for longitudinally slitting the sleeves, with portions broken away;

FIG. 20 is a view in elevation of the apparatus shown in FIG. 19;

FIG. 21 is a transverse view of a sleeve slit by means of this apparatus;

FIG. 22 is an isometric view of an alternative embodiment of cutting tool for slitting the sleeve;

FIGS. 23 and 24 are transverse views of the sleeve and showing the alternative slitting tool;

FIG. 25 is a transverse view of a slit sleeve having a jointed profile, as will be explained;

FIGS. 26 through 28 are diagrammatic views showing profile knives with several blades; and FIG. 29 is a view of a spread-out sleeve formed by means of several slitting blades.

Figure 1A:
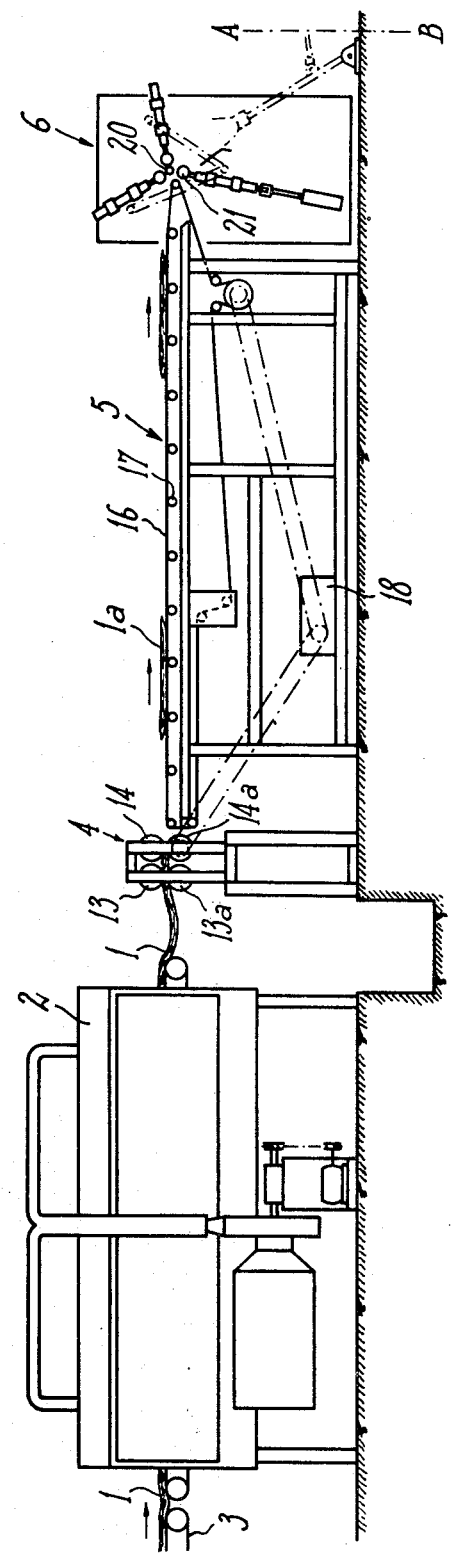
Figure 1B:
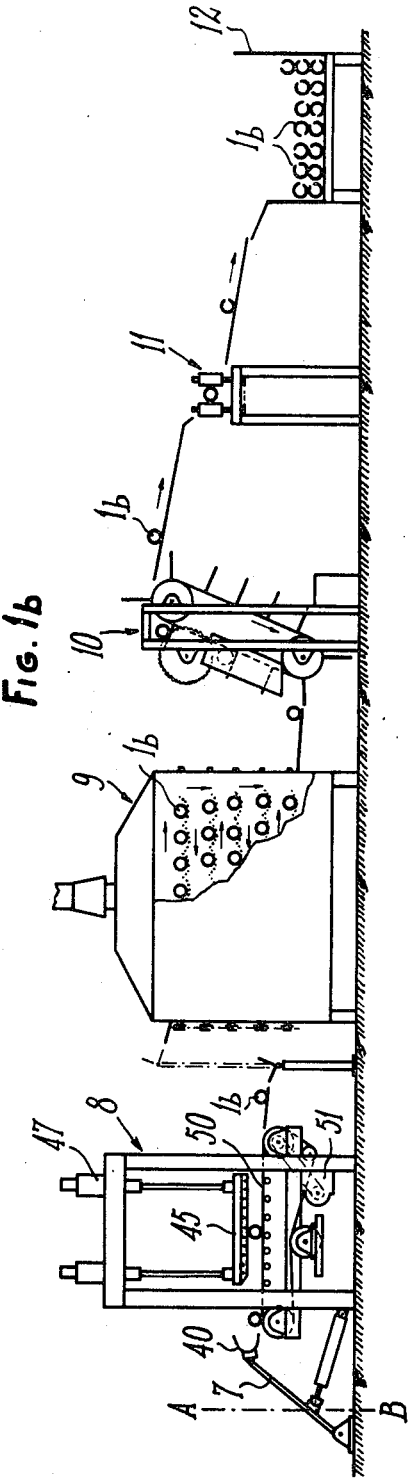

The overall system represented in FIGS. 1a–1b comprises the following successive features:

a drying oven 2 that receives from a conveyor 3, a web or blanket 1 of fibrous material in which a binder is distributed for instance from a glass fiber production unit of known types. This oven can be of any convenient known type and thus will not be described in detail. The oven is used in the system described to effect drying but does not apply sufficient heat to polymerize or cure the binder, so that the oven delivers a fibrous web having uncured binder. This preliminary drying in the oven 2 is desirable in order to permit rapid curing of the inside surface layer of the sleeve when the mat is wound upon the mandrel.

an apparatus 4 providing for tearing of web 1, or other uncured bonded mat, into pieces of predetermined length;

a conveyor 5 transporting the pieces of mat;

an apparatus 6 comprising a rotating mandrel for winding the pieces of mat in order to form them into sleeves while curing the inner surface of said sleeves;

a transporting component 7;

an apparatus 8 for smoothing the outside surface of the sleeves and for curing the binder in the outside surface layer;

an oven 9 to complete the curing or polymerization of the sleeves;

a cutting apparatus 10 for the ends of the sleeves to give them the desired length;

an apparatus 11 for slitting the sleeves longitudinally;

a station 12 for packaging the sleeves.

Certain of the major components of the above system are considered herebelow under corresponding headings.

Apparatus for tearing the web of mat (FIGS. 2a through 2d)

This apparatus includes four driven rollers synchronized with the conveyor 5. The downstream rollers 14–14a are constantly driven at a tangential or peripheral speed $V_2$. The upstream rollers 13–13a are alternately driven and braked. When driven they rotate at the tangential speed $V_2$, and they are braked for example, by an automatic timer.

FIG. 2a shows the beginning of the working cycle of this apparatus. The web or blanket, is entering between the rollers 13–13a which are here shown braked or stationary. The web lies adjacent to a sensing device such as a photosensitive cell 15.

The mat exiting from the drying oven 2 at constant speed $V_1$ accumulates, forming a loop upstream of the rollers 13–13a, these being at rest in braked condition (FIG. 2b).

An automatically timed switch initiates the engagement of the drive of the rolls 13–13a at the tangential speed $V_2$. This occurs following advance of the piece of the mat beyond the photocell 15, at a predetermined interval corresponding to the length of the piece of mat. This results in take-up of the loop of the mat shown in FIG. 2c. At the moment the loop is entirely taken-up, the mat again intercepts the light to the photocell 15. This results in application of the brake to rollers 13–13a. Because of the stress which is exerted on the mat, the driven rollers 14–14a tear the mat between the rollers 13–13a and 14–14a (FIG. 2d). The formed piece 1a is taken off and a new cycle begins.

Conveyor for the pieces of mat (FIG. 3)

The conveyor, that carries the pieces of the mat from the tearing apparatus to the winding apparatus, is formed of a smooth polyamide belt 16 that permits the mat to slide without tearing at the moment of its winding. The winding in fact confers on the mat an increasing acceleration in proportion to the increase in diameter of the sleeve in the course of formation.

The belt 16 is supported horizontally by a series of rollers 17 of small diameter or by longitudinal slides. It is controlled by a variable speed drive 18, which also drives the rollers of the tearing apparatus.

In the region of the winding apparatus, the supporting roller 19 for the conveyor 16 is mounted for vertical adjustment movement as indicated in FIG. 3, in order to provide for delivery of the lengths of mat accurately at the desired elevation in relation to the winding mandrel being employed.

Instead of a belt conveyor as shown in FIG. 3, a transporting apparatus can be used such as that represented as an alternative in FIG. 3a. This alternative comprises rollers 13–13a, 14–14a, (as in FIG. 3), a belt 16 and roller 19 adjustable in height. In the embodiment of FIG. 3a, it is contemplated that the rollers 13–13a and 14–14a again be used for breaking the web. In this embodiment, however, the conveyor belt 16 is driven by the roller 14a, instead of through separate driving rollers as in FIG. 3. A driving motor is indicated as 18a.

Apparatus for forming the sleeves (FIGS. 4 through 9)

This apparatus comprises a heated mandrel formed in two sections 20–20a and three rollers 21 having axes parallel to the mandrel and which are spaced approximately 120° from each other around the mandrel. These rollers, which serve as guides, are mechanically interlinked and separate progressively from the axis of the mandrel according to the build up of the sleeve.

The mandrel halves 20–20a of the mandrel are mounted on carriages 22 being positioned in a transverse frame structure 23 mounted on the upright structure or enclosure 24. The ball-bearing slides 33 and the guide rollers 33a mount the carriage on the guide rods 33b and 33c (see particularly FIGS. 4 and 6) and provide for translational movement of the carriages 22. The rotation of the half-mandrels 20–20a is obtained from a motor 25 through the gearing 25a and the intermediate transmission shafts 26 each of which drives a fluted shaft 26a (see particularly FIG. 4). A pulley 26b is rotatively mounted on the carriage 22 and has a fluted hub slidably mounted on and driven by the shaft 26a. A belt 26c (see particularly FIGS. 4 and 7) interconnects the pulleys 26b and 26d, which latter is keyed to the hollow mandrel driving shaft 22b (see particularly FIG. 5). The shaft 22b is journalled on the carriage 22. The jacks 27 acting on the carriage 22 move the half-mandrels toward and away from each other.

The rollers 21 are rotated from a motor 28 through a reducer 29 and through shafts 29a which are interconnected by a belt or chain 29b cooperating with sprochets 29c mounted on the shafts 29a (see particularly FIGS. 4 and 9). The separation of rollers 21 in respect to the axis of the mandrel is obtained by means of levers 30 connected by links controlled by a jack 31 and supported by lateral end bearing plates 34 (see particularly FIGS. 4 and 8). The ends of these levers have followers running in guide slots 35 which are formed in the lateral end bearing plates 34 of the frame structure. The links 30a which interconnect the levers 30 provide for relative adjustment of the levers to thereby accommodate the apparatus to mandrels of different diameter. The jack 31 is mounted for adjustment by means of a manually adjustable screw thread device 31a, having a control wheel 31b providing for shifting the range of movement of the levers 30 by the jack 31, as may be required to accommodate mandrels of different sizes and also accommodate the production of sleeves of different wall thickness (see particularly FIG. 8). Each mandrel half (20 and 20a) is of tubular construction and has extended therein an electrical resistance heater element. One end of the heater element is electrically connected with the inner or free end of the mandrel half, and the other end of the resistance element has a connection 36a at the end of the mandrel half near the carriage 22. Slip rings 36b rotating with the mandrel mounting shaft 22b cooperate with contacts 36. Electrical connections are provided between the slip rings and the central conductor 36a and also with the mandrel mounting shaft 22b and thus with the shell of the mandrel. In this way, a heater supply circuit is provided by means of which each mandrel half is heated.

This apparatus functions in the following manner:

Prior to the arrival of the mat piece 1a the ends of the two half-mandrels 20-20a are in engagement with each other, thus providing a complete mandrel on which the sleeve is wound. The mandrels-halves are heated to about 400° C. The leading end of the pieces of mat contacts the hot mandrel and adheres to the mandrel in order to form the first layer. The polymerization of the binder in the inner surface layer of the sleeve is effected during the winding operation. The mandrel turns at a constant speed in a range of 80 to 800 revolutions/minute and the mat winds at a progressively accelerating speed. The three rollers 21 which are mechanically interconnected separate simultaneously at slow speed exerting a constant pressure in the sleeve being formed.

The rollers 21 are maintained in engagement with the outside surface of the sleeve being formed during the build up of the layers of the mat, and preferably the rollers are retained in engagement with the sleeve even after the build up of the layers in order to provide a smooth exterior surface on the sleeve. The binder in the inner surface layer is cured during the build up of the sleeve, and this curing facilitates the withdrawal of the mandrel halves from the ends of the sleeves, which occurs while the rollers 21 are being rotated in contact with the outside surface of the sleeve.

At the end of this operation, after the mandrel halves have been withdrawn, the rollers 21 separate rapidly and the sleeve drops out of position. Immediately after the fall of the sleeve, the rollers regroup themselves around or about the mandrel halves and serve to guide them while they return to their operating position, their rotation being continued. A new cycle of winding can now begin.

The sleeve 1b, exiting from this apparatus has a hard smooth inner surface obtained from the contact of the mat with the heated mandrel, while at the same time the outer surface has undergone a first smoothing operation by action of rollers 21.

The working cycle of the mandrel and the rollers can be controlled by a photosensitive cell hidden from view by the piece of mat carried by belt 16, this cell giving the termination of the cycle by a timer regulable in relation to the length of the path from the cell to the mandrel.

It will be understood that various automatic controls may be provided in order to time, synchronize and otherwise regulate the relationship of various operations, but as these controls may take a variety of forms they need not be considered in detail herein.

Figure 10:
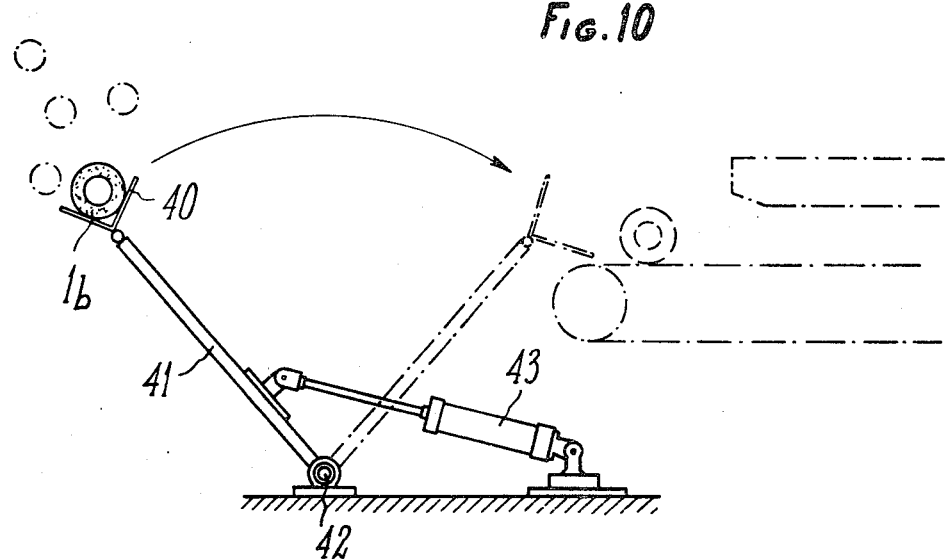
FIG. 10 is a view in elevation of the apparatus for transferring the sleeves from the winder to the apparatus for smoothing and polymerization of the outer surface of the sleeves.

Transport component for the sleeves from the forming apparatus to apparatus for polymerizing the outer surface (FIG. 10)

This component receives the sleeves 1b in a trough 40 placed horizontally under the winding apparatus. This trough is fixed to a support frame 41 mounted on a pivot 42 and pivotable under action of a jack 43. At the end of the stroke of the jack, the sleeve, which is supported throughout its entire length by the trough 40, rolls out of the trough and is delivered in transverse position onto the belt of the polymerization apparatus for the outer surfaces.

Figure 11:
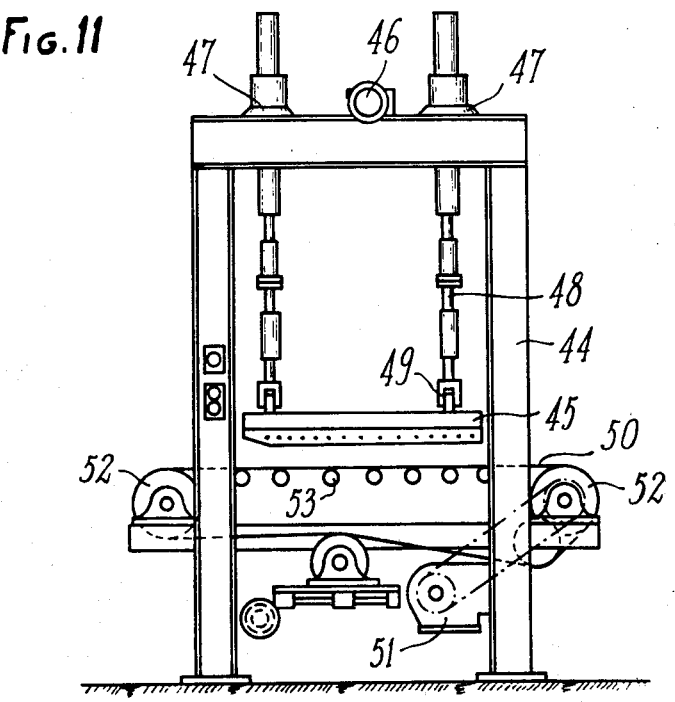
FIG. 11 is a view in elevation of the smoothing apparatus.
Figure 12:
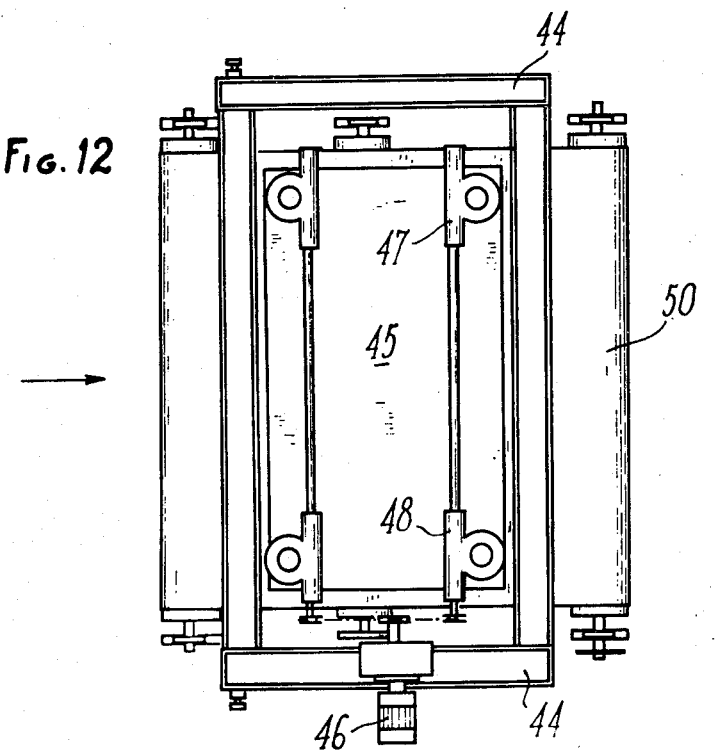
FIG. 12 is a plan view of the apparatus shown in FIG. 11.

Apparatus for polymerization of the outer surface of the sleeves (FIGS. 11 and 12)

This apparatus has a frame structure 44 in shape of a double cross beam supporting at its upper part a lifting system to raise the height of a heating plate 45 provided with electric resistances in its interior. This lifting system is composed of a reduction gearing 46 with electric brakes and of four screw jacks 47 controlled simultaneously by this reduction gearing. These jacks are connected to the heating plate 45 by rods 48 of regulable lengths joining on the heating plate by means of fork-joints 49. The heating plate is thus supported horizontally by the screws.

At its lower part the apparatus comprises a belt 50 driven by a variable speed motor 51 and held horizontally between two rollers 52. The upper run of this belt is supported by rollers 53 of small diameter.

The temperature of the plate 45 is about 400° C.

The sleeves 1b carried by the transfer apparatus pass between belt 50 and plate 45 and advance, turning on themselves under the action of the belt with light compression against the plate. Correction of the outer diameter and a stabilization of the contour of the sleeves is effected by this apparatus. In addition, due to the temperature of plate 45, the outer surface of the sleeves are polymerized and acquire a smooth skin, of good quality, and this eliminates any necessity for grinding or trimming.

Polymerization oven for the sleeves (FIGS. 13 through 16f)

The sleeves exiting from the smoothing apparatus are conveyed to an oven 9 provided to effect complete and uniform curing of the sleeves to a temperature about 250° C., thus permitting the polymerization with a minimum of fumes and gaseous release. In the course of curing in this oven, the sleeves are carried without constraint, in such a way as to avoid delamination of the outer layers, without shock and without rubbing likely to cause harmful surface defects. In addition, during the time in this oven, the sleeves are maintained perfectly straight throughout their entire length, and are completely rotated about their axes in such a way as to cause uniformity of curing.

Immediately after the exit from the smoothing apparatus, each sleeve is received in a support lifting mechanism including trough 54 connected with the piston rod of a jack 56. A cell records the presence of the sleeve and controls the transfer to the upper level of the oven. During this vertical transfer, the lateral position of the sleeve may be recentered by lateral guides. At the upper end of the upward stroke of the jack, the trough 54 rocks and the sleeve rolls into the oven. An entrance door 61, operated by a jack 62 stops the sleeve for a short moment prior to its entry. The opening of this door is timed and of limited duration in order to diminish the loss of heat from the oven.

In order to extend the time of the sleeves in the oven, and at the same time minimize the size of the oven, the oven includes several superimposed levels, five in number in the representative example here shown.

The arrangement of supports for the sleeves in the curing oven is as follows.

Figure 13:
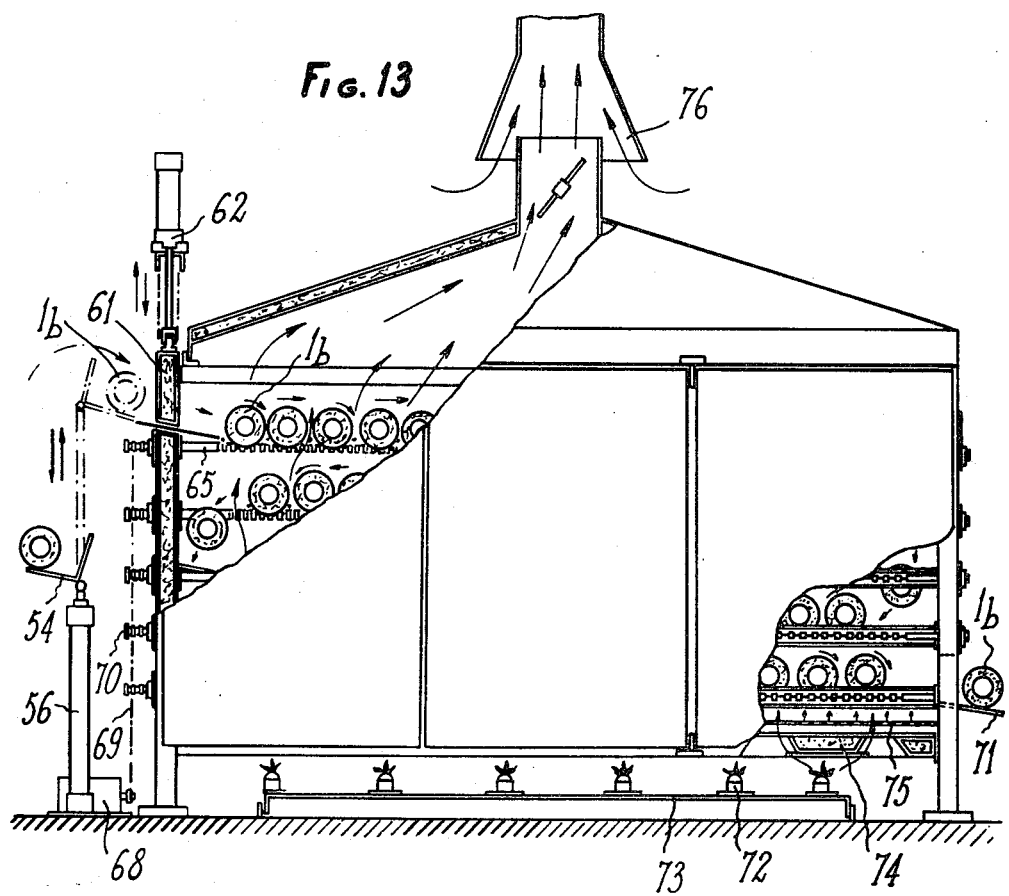
FIG. 13 is a view in elevation, with portions broken away, showing the polymerization oven.

The supports for the sleeves at each layer of the superimposed layers of the feed path of the sleeves includes a series of rods 63 which extend in directions perpendicular to the plane of FIG. 13, and one series of which are shown in transverse section in FIGS. 16a to 16f. Each set of these rods make up a deck for supporting the sleeves at one of the treatment levels in the oven. Each set of rods is in turn supported at its ends by a pair of crank shafts comprising spindles 64 and crank elements 65, there being one such crank shaft arranged at each end of each set of supporting rods 63 in positions beyond the ends of the sleeves carried by the rods.

Figure 15:
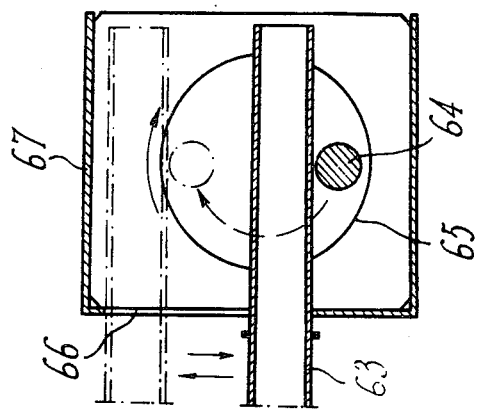
FIGS. 14 and 15 are detailed views illustrating apparatus for advancing and turning the insulation sleeves in the polymerization oven.
Figure 14:
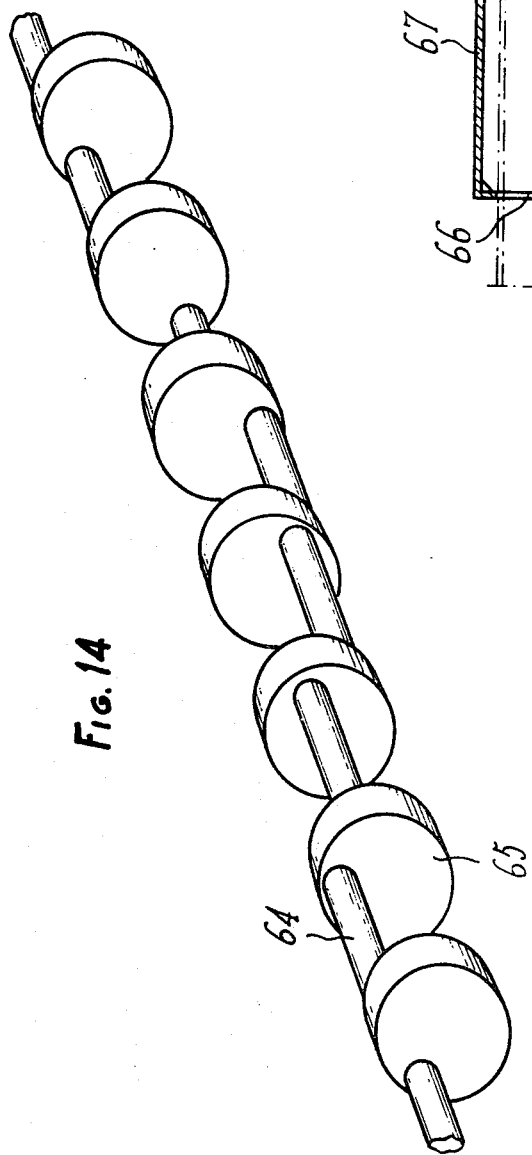

The configuration of one such crank shaft appears in FIG. 14, and in FIGS. 16a-16f the crank shaft there shown is positioned beyond the end of the sleeve 1b shown as supported by the set of rods illustrated in those figures. As the crank shafts are rotated in synchronism with each other and because of the engagement of the pins 64 with the ends of the rods 63 (see also FIG. 15), the rods 63 move with a sinusoidal wave motion as the crank shafts rotate. This motion is indicated in FIG. 15 and is guided by slots 66 formed in the enclosure 67 which serve to shield the crank shafts from the ends of the sleeves and also to guide the sleeves as they are advanced. The sinusoidal action is illustrated in FIGS. 16a to 16f and it will be seen that toward the left in each of those figures a diagram is reproduced showing the illustrated extent of rotation of the crank shafts throughout one revolution, in 60° increments, which corresponds to the angular displacement of the successive support pins 64 of each crank shaft.

It will be seen that in consequence of the sinusoidal wave motion, each sleeve 1b is caused to roll as it is advanced lengthwise of the crank shafts. Moreover, as the sleeve rolls on the rods 63, different surface areas of the outside surface of each sleeve are progressively contacted and exposed. At the end of the first level of the feed path in the oven, the sleeves are dropped by gravity down to the next level and the wave motion of the supporting rods 63 of the second level then causes the sleeves to advance in the other direction (to the left as viewed in FIG. 3), the rotation of the sleeves being continued. Again, at the left end of the second level, the sleeve again drops to the third level, and proceeds again to the right, and so forth throughout all levels of the oven, finally being discharged at the inclined delivery plate 71.

The crank shafts are adapted to be driven by a variable speed motor 68 by means of a chain 69 engaging sprockets 70 on the ends of the crank shafts, this drive being arranged to provide appropriate rotation of the crank shafts to impart sinusoidal wave motion of the supporting rods of each succeeding level in opposite directions, so that the sleeves will be fed first in one direction across the oven and then in the opposite direction on the next level.

During this feed on the sleeves through the oven each sleeve is subjected to a flow of the curing medium, preferably heated air and because of the support of the sleeves upon the spaced rods 63 in each treatment level and further because of the continued rotation of the sleeves as they advance, the curing air contacts all surfaces of the sleeves and will of course enter to some extent within the pores of the sleeves, thereby enhancing the uniformity of the curing action and minimizing the time in the curing oven.

Heating of the oven is effected by means of gas burners 72 arranged at the floor 73 of the oven. Refractory baffles 74 are provided above the individual burners 72 in order to avoid localized overheating and to distribute the heating gases. Further distribution of the heating gases is effected by means of a perforated metal sheet 75 overlying the baffles 74 and spaced above the baffles.

The hot air is evacuated by the flue 76.

Figure 17:
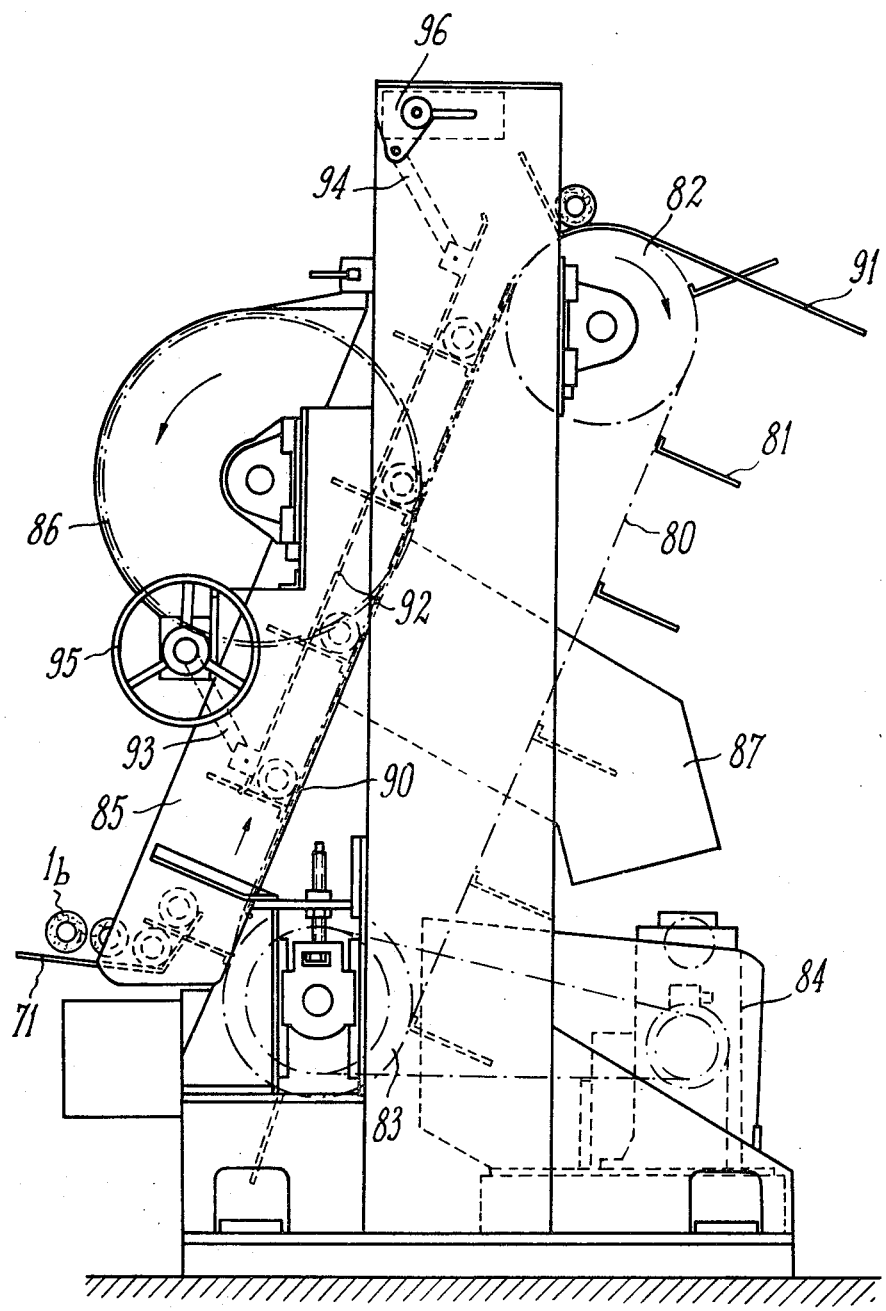
FIG. 17 is a view in elevation of apparatus for cutting the ends of the sleeves.

Apparatus for cutting the ends of the sleeves (FIG. 17)

The sleeves leaving the oven roll on support 71 by cavity to a lifting device composed of two chains 80 on which palettes 81 are fixed. These chains are mounted by means of pairs of sprochet 82 and 83, the pinions 83 being driven by power means including a reduction gearing 84.

On each side of the chains are seen the fixed lateral guides 85 which engage the ends of the sleeves and maintain them in a centered position. The apparatus comprises also a guide composed of a metal plate 90 placed in the plane of the ascending flights of chains 80 and which serves to support the sleeves during their passage. This metal plate is curved at its upper part in order to form an inclined plane 91. In addition to guide 90 there is a cooperating guide shoe 92 parallel to plate 90. The separation between the shoe 92 and the plate 90 is regulable by means of two links 93–94, the link 93 being controlled by a hand wheel 95, and the link 94 being mounted on an adjustable block 96.

Near the upper ends of guides 85 the ends of the sleeves are brought into contact with two spaced circular saws 86 whose shaft is driven by a motor, and which cuts the sleeves to the desired length.

The ends which were cut off are discharged by gravity by a chute 87 and the sleeves are carried up to the top of the lifting device and roll onto the inclined plate 91 which directs them toward the following apparatus.

Apparatus for slitting the sleeves (FIGS. 18 through 25)

After pivoting by means of an apparatus such as that represented in FIG. 18 and including a stopblock 100 and a slide 101, the sleeves are axially advanced by a transporter 102 in the form of diabolo rollers, the height of this transporter being regulable in such a way as to advance the sleeves accurately in line with the axis of the knife support of the slitter.

The slitter includes a cylindrical rod 103 in which a triangular slitting blade is mounted, the blade lying in a diametrical plane and having its point presented toward the advancing ends of the sleeves and further having its base end positioned asymmetrically with respect to the rod 103, so that the blade has a relatively large exposed part 104a at one side and a relatively large exposed part 104b at the other side. The larger blade part 104a is of sufficient width so that it will penetrate or cut all the way through the wall of the sleeve at that side, the blade part 104b being narrower and serving to form a slit of limited depth in the inside wall of the sleeve diametrically opposite to the cut formed by the blade 104a.

The rod 103 has a point 105 which enters the sleeve when it reaches the slitter, and also has a support 106 for the blade which is fixed on the base or frame 107.

On each side of the slitter blades, a fixed guide wall element 109 is provided, lying between the flights of an internally notched belt 108 having rotative supporting elements in each end, the elements 110 being in the nature of drive pulleys which are driven by a variable speed motor 112 positioned within the base 107. Preferably provision is made for varying the distance between the two assemblies of the fixed wall elements and belts at the two sides of the path of movement of the sleeves as they are moved over the slitter. This spacing means may be adjusted by means of the hand wheel 113. This provides for engagement and feed of sleeves of different sizes with relation to the slitting knives.

The belts thus constitute means for advancing the sleeves over the cutter, thereby producing slits such as indicated at 114 in FIG. 21 extending through the entire wall of each sleeve, and also the partial slits 115 extended through only a portion of the wall of the sleeves. These slits are provided for the purpose of facilitating opening of the sleeve at the time they are used, as in applying them to a pipe or conduit, the incomplete slit 115 leaving a certain thickness of material which will retain the two halves in the proper relation but which will not interfere with opening of the sleeve to apply it to a pipe.

In the alternative embodiment of FIG. 22, the cutting blade tool is positioned so that the parts 104a–104b slit the sleeves only through a part of their thickness. The slitter also includes a cutting wheel 116 placed in advance of the downstream end of the blade 104a, thereby producing in the sleeves a limited slit through the thickness of the sleeves at both sides thereof, instead of only at one side as in FIGS. 19 and 20. The slit made by the wheel 116 can either be in the plane of the slit obtained by the part 104a of the blade (FIG. 23) or can be angularly displaced (FIG. 24). In the first case a slit is obtained (extending through the wall of the sleeve) such as those produced by the cutting tool of FIG. 19, and in the second case a slit 118 is obtained displaced in respect to the incomplete slit 114a (FIG. 25), the space between these two slits being sufficiently small to permit rupture of the thickness of material separating them at the time the sleeve is opened for application to a pipe.

The slit produced in the outside surface of the sleeve by means of the wheel permits obtaining a clean cut, even on the lips of the slit.

Instead of a wheel, a cutting blade can equally as well be used, placed as the wheel, either in the plane of the blade 104a, or angularly displaced therefrom.

The cutting tool can include several knives. FIGS. 26 through 28 show respectively the profiles of knives of two, three and four blades. The use of such knives permits the spreading of the sleeve. FIG. 29 shows the spreading of the sleeve having been slit by means of a four bladed knife.

In connection with known forms of apparatus in which the slitting of the sleeve is effected by the use of a slitting saw, it is to be noted that the apparatus of the present invention is of particular advantage since the use of slitting knives, instead of a saw, virtually eliminates the production of dust and also makes possible the employment of slits of the kind shown in FIG. 25 in which a partial slit formed through the inside surface of the sleeve is utilized. The apparatus of the invention is also of simple form and construction.

We claim:

1. Apparatus for making longitudinally slit fibrous sleeves including means for feeding sleeves to be slit in a feed path; means for slitting the sleeves in said path; and means for supplying sleeves to the feeding means; the supply means including means for delivering separate sleeves endwise and in end-to-end relation into the feed path of the feeding means; the slitting means comprising a centering rod adapted to engage and pass through the bore of sleeves being slitted, the rod carrying a slitting knife having a slitting edge inclined with respect to the feed path and positioned to enter the interior of the sleeves when they are advanced in said feed path and form a radial slit in the wall of the sleeves, the slitting knife having a leading end and a trailing end, and supporting means for the centering rod and slitting knife, the supporting means being connected with the centering rod downstream of the slitting knife and lying in the plane of the knife thereby providing for projecting of the supporting means radially through the slit formed in each sleeve by the knife carried by the centering rod; and the feeding means including means for advancing the sleeves sequentially in end-to-end relation comprising a pair of conveyor belts having conveyor runs lying in planes parallel to and spaced at opposite sides of the slitting knife to engage and grip opposite outside surfaces of the sleeves, the conveyor runs in engagement with the sleeves being driven in a direction from the leading end of the knife to the trailing end of the knife and the conveyor runs in engagement with the sleeves being of sufficient length to extend throughout the length of and beyond the knife.

2. Apparatus as defined in claim 1 in which the centering rod is extended from the knife in a direction upstream of the feed path of the sleeves so as to enter each sleeve prior to the knife.

3. Apparatus as defined in claim 1 in which a plurality of slitting knives is mounted on the centering rod, being positioned at points spaced circumferentially of the sleeves.

4. Apparatus as defined in claim 1 in which the conveyor belts are provided with driving means mounted for adjustment movement toward and away from opposite sides of the slitting knife.

* * * * *